US007935416B2

(12) United States Patent
Yang et al.

(10) Patent No.: US 7,935,416 B2
(45) Date of Patent: May 3, 2011

(54) NANOPOROUS MEMBRANE, PROCESS OF FABRICATING THE SAME AND DEVICE FOR CONTROLLED RELEASE OF BIOPHARMACEUTICALS COMPRISING THE SAME

(75) Inventors: Seung Yun Yang, Kyungsangbuk-do (KR); Sei Kwang Hahn, Gyeongsangbuk-Do (KR); Jin Kon Kim, Gyeongsangbuk-Do (KR); Jung-A Yang, Kyungsangbuk-do (KR)

(73) Assignee: Postech Academy-Industry Foundation, Kyungsangbuk-do (KR)

( * ) Notice: Subject to any disclaimer, the term of this patent is extended or adjusted under 35 U.S.C. 154(b) by 383 days.

(21) Appl. No.: 12/132,914

(22) Filed: Jun. 4, 2008

(65) Prior Publication Data

US 2009/0208726 A1 Aug. 20, 2009

(30) Foreign Application Priority Data

Feb. 14, 2008 (KR) ........................ 10-2008-0013485

(51) Int. Cl.
*B32B 5/18* (2006.01)
*B05D 3/10* (2006.01)
*A61F 13/00* (2006.01)
*C23C 14/34* (2006.01)

(52) U.S. Cl. ............... 428/312.8; 428/315.5; 428/315.7; 428/315.9; 428/457; 428/461; 428/462; 427/2.31; 427/307; 427/314; 427/372.2; 427/430.1; 427/245; 427/385.5; 204/192.1; 623/11.11

(58) Field of Classification Search ........................ None
See application file for complete search history.

(56) References Cited

U.S. PATENT DOCUMENTS 7,438,193 B2 10/2008 Yang et al.
2006/0037477 A1 * 2/2006 Lopez et al. ...................... 96/11

FOREIGN PATENT DOCUMENTS

KR 20070040668 A 4/2007

OTHER PUBLICATIONS

Translation of Korean Office Action dated Nov. 20, 2009.*
Korean Office Action dated Nov. 20, 2009.

* cited by examiner

*Primary Examiner* — Ling Xu
(74) *Attorney, Agent, or Firm* — Perman & Green, LLP

(57) ABSTRACT

Provided are a nanoporous membrane including a support; a first separation layer with a plurality of first nano-sized pores and a first matrix; and a second separation layer having a plurality of second pores respectively corresponding to the plurality of first pores of the first separation layer and a second matrix, and formed on the first separation layer, wherein a density of the plurality of the first pores and the second pores is equal to or greater than $10^{10}/cm^2$, and a diameter of each of the second pores is less than that of the corresponding first pore, a process of fabricating the same, and a device for a controlled release of biopharmaceuticals including the nanoporous membrane. The device for a controlled release of biopharmaceuticals including the nanoporous membrane can release biopharmaceuticals at a constant rate for a long period of time regardless of the concentration of the biopharmaceuticals including in pharmaceuticals, and high flex and selectivity.

17 Claims, 15 Drawing Sheets

FIG. 3A
30
FIG. 3B
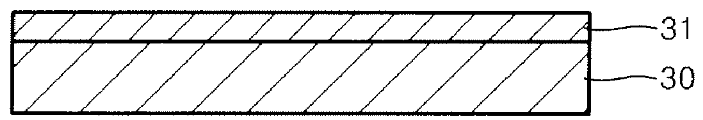
FIG. 3C
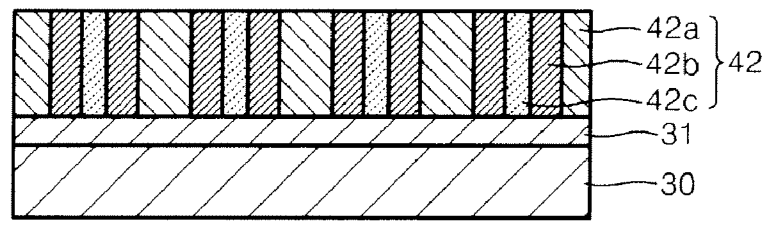

NANOPOROUS MEMBRANE, PROCESS OF FABRICATING THE SAME AND DEVICE FOR CONTROLLED RELEASE OF BIOPHARMACEUTICALS COMPRISING THE SAME

CROSS-REFERENCE TO RELATED PATENT APPLICATION

This application claims the benefit of Korean Patent Application No. 10-2008-0013485, filed on Feb. 14, 2008, in the Korean Intellectual Property Office, the disclosure of which is incorporated herein in its entirety by reference.

BACKGROUND

1. Field of the Invention

The disclosed embodiments relate to a nanoporous membrane, a process of fabricating the same, and a device for a controlled release of biopharmaceuticals including the same, and more particularly, to a nanoporous membrane through which materials having a several nanometer size, for example, a material having an average diameter of 10 nm or less, pass according to a single-file diffusion, a process of fabricating the same, and a device for a controlled release of biopharmaceuticals including the same.

2. Description of the Related Art

Membrane filtration technologies are widely used throughout almost all industrial fields, for example, to produce ultrapure water in the electronics field, to separate medicines, such as protein, enzyme, antibody, etc., in the biotechnology field, or in a concentration process in the food industry. Membrane filtration technologies can be classified into microfiltration, ultrafiltration, nanofiltration, etc., according the size of a material to be filtered.

In general, membranes used in such filtration technologies can be manufactured using polymers. A method of manufacturing a filtration membrane is disclosed in Korean Patent Laid-open No. 10-2005-0029603. Membrane manufacturing processes can be classified into processes of manufacturing a membrane having a nominal pore size and processes of manufacturing a membrane having an absolute pore size. Processes of manufacturing a membrane having a nominal pore size involve stretching, interfacial polymerization, phase-inversion, etc. Processes of manufacturing a membrane having an absolute pore size involve track-etching in which pores are formed through the irradiation of a radioactive element and corrosion for a predetermined time.

A membrane having a nominal pore size includes pores which are abnormally larger than the nominal pore size, has poor pore size uniformity on the surface thereof, and thus cannot be used to separate or purify a particular material with a high purity. Meanwhile, a membrane having an absolute pore size has high pore size uniformity on the surface thereof and thus can purify a material with a desired high purity. However, the membrane having an absolute pore size has a low surface pore density and a thick first separation layer, which lower the flux of the membrane.

Meanwhile, membranes can also be used as a path of biopharmaceuticals in a device for a release of biopharmaceuticals. For example, an implant type device for a release of biopharmaceuticals has been recently applied in various clinical fields since each medical treatment lasts to several months, thereby economical. In order to efficiently release biopharmaceuticals in the implant type, the release speed of the biopharmaceuticals needs to be constantly controlled regardless of the concentration of the biopharmaceuticals in a container.

SUMMARY

The disclosed embodiments provide a nanoporous membrane which has a high pore density and uniform pore size, thereby having a high flux and high selectivity, and through which materials having a several nanometer (for example, materials having an average diameter of 10 nm or less) size pass according to a single-file diffusion, and a process of fabricating the nanoporous membrane. The present invention also provides a device for a controlled release of biopharmaceuticals using the nanoporous membrane as a novel use of the nanoporous membrane.

According to an aspect of the disclosed embodiments, there is provided a nanoporous membrane comprising: a support; a first separation layer comprising a plurality of first nano-sized pores and a first matrix; and a second separation layer comprising a plurality of second pores respectively corresponding to the plurality of first pores of the first separation layer and a second matrix, and formed on the first separation layer, wherein a density of the plurality of the first pores and the second pores is equal to or greater than $10^{10}/cm^2$, and a diameter of each of the second pores is less than that of the corresponding first pore.

According to another aspect of the disclosed embodiments, there is provided a process of fabricating a nanoporous membrane, the method comprising: preparing a substrate; forming an etching layer on the substrate; coating a phase-separable copolymer-containing composition on the etching layer and hermally treating the same to form a phase-separated copolymer layer; dipping the substrate having the phase-separated copolymer layer in an etching solution containing a support to fix the phase-separated copolymer layer to the support; dipping the support having the phase-separated copolymer layer in an acid solution to form a plurality of first nano-sized pores in the phase-separated copolymer layer, thereby forming in a first separation layer including a plurality of first nano-sized pores and a first matrix on the support; and forming a second separation layer comprising a plurality of second pores respectively corresponding to the plurality of first pores and having a diameter less than that of the first pores and a second matrix on the first separation layer.

According to another aspect of the disclosed embodiments, there is provided a device for a controlled release of biopharmaceuticals comprising the nanoporous membrane.

BRIEF DESCRIPTION OF THE DRAWINGS

The above and other features and advantages of the present invention will become more apparent by describing in detail exemplary embodiments thereof with reference to the attached drawings in which:

FIG. 2A schematically illustrates a Fickian diffusion;

FIG. 2B schematically illustrates a single-file diffusion;

FIGS. 3A to 3F are cross-sectional views for explaining a process of fabricating the nanoporous membrane according to an embodiment;

DETAILED DESCRIPTION OF THE DISCLOSED EMBODIMENTS

Hereinafter, the present invention will now be described more fully with reference to the accompanying drawings, in which exemplary embodiments of the invention are shown.

Figure 1A:
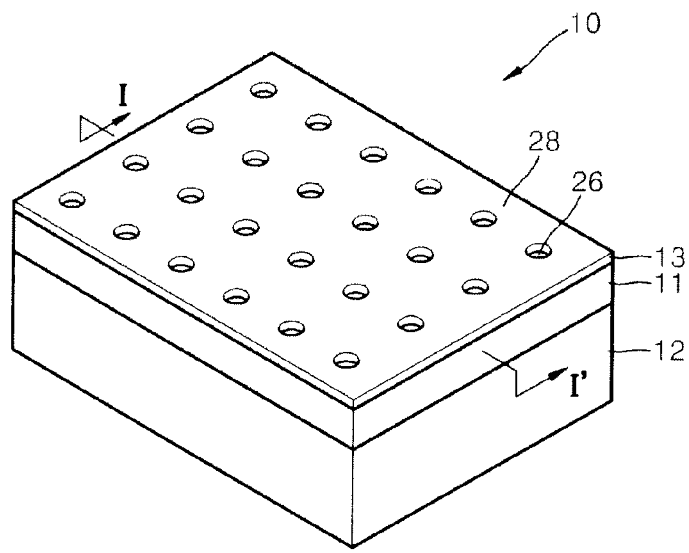
FIG. 1A is a perspective view of a nanoporous membrane according to an embodiment.
Figure 1B:
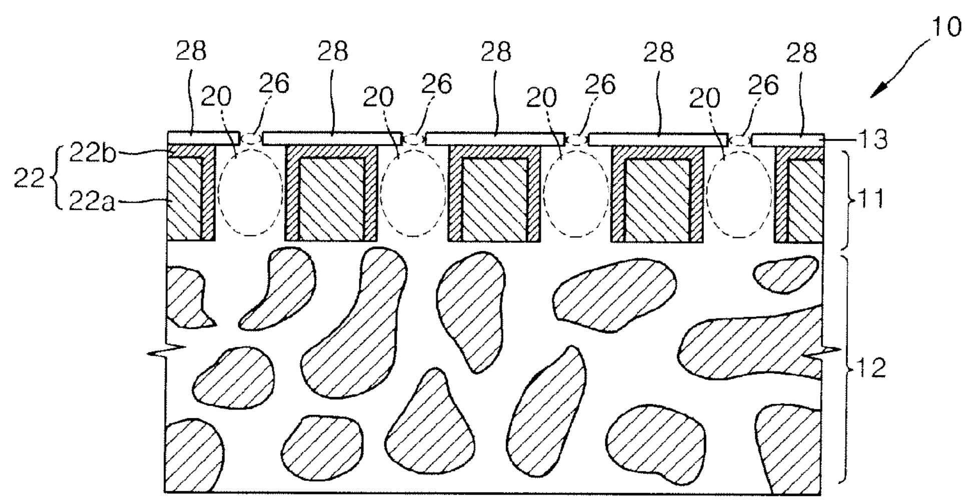
FIG. 1B is a cross-sectional view of the nanoporous membrane of FIG. 1A (taken along line I-I')

FIG. 1A is a perspective view of a nanoporous membrane according to an embodiment, and FIG. 1B is a cross-sectional view of the nanoporous membrane of FIG. 1A taken along line I-I'.

A nanoporous membrane 10 shown in FIGS. 1A and 1B includes: a support 12; a first separation layer 11 including a plurality of first nano-sized pores 20 and a first matrix 22; and a second separation layer 13 including a plurality of second pores 26 formed on the first pores 20 such that each of the second pores respectively correspond to the plurality of first pores 20 and a second matrix 28.

Here, the "first pores" indicates pores 20 included in the first separation layer 11 as shown in FIGS. 1A and 1B, and the "second pores" indicates pores 26 included in the second separation layer 13 as shown in FIGS. 1A and 1B. In addition, the "first matrix" indicates a region 22 of the first separation layer 11 except for the first pores 20 as shown in FIGS. 1A and 1B, and the "second matrix" indicates a region 28 of the second separation layer 13 except for the second pores 26 as shown in FIGS. 1A and 1B.

The support 12 of the nanoporous membrane 10 maintains and supports the structure of the first separation layer 11 and the second separation layer 13. The support 12 may be formed of a material that is highly flowable and resistant against chemicals and can form a smooth surface. In addition, the material of the support 12 may be highly permeable to a material that has passed through the first separation layer 11 and the second separation layer 13 such that proteins or microorganisms do not adsorbed to the material.

For example, an average pore diameter of the support 12 may be 0.05 to 0.5 μm on the surface of the support 12. The support 12 may be formed of a polysulfone polymer, but is not limited thereto. The support 12 may also be formed of any polymer membrane that has a higher permeability than the first separation layer 11 and the second separation layer 13 and is resistance to acid.

The thickness of the support 12 is not limited provided that the support 12 is thick enough to maintain and support the structure of the first separation layer 11 and the second separation layer 13. When the support 12 is too thick, the material flow paths of the nanoporous membrane 10 are so long that the flux of the nanoporous membrane 10 may decrease. In this view, the thickness of the support 12 may be, for example, 150 μm, but is not limited thereto. Commercially available products of various chemical companies can be used as the support 12.

The first separation layer 11 of the nanoporous membrane 10 and the second separation layer 13 selectively passe materials. A density of the plurality of first pores 20 in the first separation layer 11 may be equal to or greater than $10^{10}/cm^2$, and preferably in the range of $10^{10}/cm^2$ to $10^{12}/cm^2$. Thus, the first pores 20 in the first separation layer 11 of the nanoporous membrane 10 according to the disclosed embodiments may occupy about 20% or greater of the surface of the first separation layer 11.

The average diameter of the first pores 20 in the first separation layer 11 of the nanoporous membrane 10 may be adjusted by controlling the size of material to be passed through the nanoporous membrane 10, for example, virus, impurities, etc. The average diameter of the first pores 20 in the first separation layer 11 of the nanoporous membrane 10 may be adjusted to, for example 6 to 40 nm, but is not limited thereto.

The diameters of the first pores 20 in the first separation layer 11 of the nanoporous membrane 10 are very uniform. The uniformity of diameters of the first pores 20 can be expected from the standard deviation of diameters of the pores 20. The standard deviation of diameters of the first pores 20 in the first separation layer 11 of the nanoporous membrane 10 according to the disclosed embodiments may be 3 or less, for example, in a range of 0.0001-3. Since the nanoporous membrane 10 according to the disclosed embodiments has a uniform pore diameter, it can be used for filtration on the scale of several nanometers. In other words, the nanoporous membrane 10 according to the disclosed embodiments has a high selectivity.

The first pores 20 in the first separation layer 11 of the nanoporous membrane 10 may penetrate through the first separation layer 11 in a direction perpendicular to a surface of the support 12. In this case, the length of the first pores 20, which serve as material flow paths, may be minimized.

The first matrix 22 of the first separation layer 11 of the nanoporous membrane 10 may include an inner portion 22*a* and a surface portion 22*b* covering the inner portion 22*a*. For example, the inner portion 22*a* and the surface portion 22*b* can be formed of different polymers because a phase-separable copolymer can be used to form the separation layer 11. For example, the inner portion 22*a* can be formed of polystyrene while the surface portion 22*b* can be formed of polyacryl, polyisoprene, polyethylene oxide or polybutadiene. However, the first matrix 22 is not limited to this structure.

The first separation layer 11 of the nanoporous membrane 10 may have a thickness of 10-200 nm, preferably 10-150 nm and more preferably 10-100 nm. When the thickness of the first separation layer 11 is less than 10 nm, it is difficult to control the pore diameter. On the other hand, when the thickness of the first separation layer 11 is greater than 200 nm, the material flow paths are too long. The thickness of the first separation layer 11 can be varied by controlling, for example, the coating rate of a phase-separable copolymer-containing composition to be described later.

The second separation layer 13 is formed on the first separation layer 11 of the nanoporous membrane 10. The second separation layer 13 includes a plurality of second pores 26 and a second matrix 28. The second pores 26 are formed on the first pores 20 in the first separation layer 11 such that each of the second pores 26 corresponds to the first pores 20. Thus, the density of the second pores 26 in the second separation layer 13 is substantially identical to the density of the first pores 20 of first separation layer 11. In addition, the second pores 26 in the second separation layer 13, like the first pores 20, penetrate through the second separation layer 13 perpendicular to a surface of the support 12.

Meanwhile, a diameter of each of the second pores 26 in the second separation layer 13 is less than that of each of the first pore 20 corresponding to the second pores 26. An average diameter of the second pores 26 may be in the range of 6 to 30 nm, preferably 3 to 20 nm, and may be adjusted to be less than an average diameter of the corresponding first pores 20 in consideration of the size of materials, for example the size of biopharmaceuticals, to be passed through the nanoporous membrane 10 of the disclosed embodiments.

The uniformity of diameters of the second pores 26 in the second separation layer 13, like the uniformity of diameters of the first pores 20 in the first separation layer 11, may be expected from the standard deviation of diameters of the second pores 26. The standard deviation of diameters of the second pores 26 in the second separation layer 13 of the nanoporous membrane 10 according to the disclosed embodiments may be 3 or less, preferably in the range of 0.0001 to 3. Since the second separation layer 13 and the first separation layer 11 of the nanoporous membrane 10 according to the disclosed embodiments have a uniform pore diameter and can be used for filtration on the scale of several nanometers. In other words, they have high selectivity.

Using such a second separation layer 13, the nanoporous membrane according to the disclosed embodiments can diffuse/release materials having a several nanometer size, for example, materials having an average diameter of 10 nm or less at a constant releasing rate according to a single-file diffusion.

FIG. 2A schematically illustrates a Fickian diffusion, and FIG. 2 schematically illustrates a single-file diffusion.

As shown in FIG. 2A, if a diameter of a first channel 1*b* through which a first particle 1*a* passes is, for example, 4-5 times larger than a diameter of the first particle 1*a*, the first particle 1*a* passes through the first channel according to the Fickian diffusion. Thus, the speed of the first particle 1*a* passing through the first channel 1*b* is proportion to a concentration difference of the first particle 1*a* before and after the first particle 1*a* passes through the first channel 1*b*. That is, since the initial release speed of the first particle 1*a*, which is fast, is decreased over time, a time-release speed graph has a parabolic curve.

However, as shown in FIG. 2B, if a diameter of a second channel 2*b* through which a second particle 2*a* passes is larger than, for example up to 1.5-2 times larger than, a diameter of the second particle 2*a*, the second particle 2*a* passes through the second channel 2*b* according to the single-file diffusion. Thus, a constant number of the second particles 2*a* can only pass through the second channel 2*b* regardless of the concentration difference of the second particle 2*a* before and after the second particle 2*a* passes through the second channel 2*b*. Thus, the speed of the second particle 2*a* is constant.

Accordingly, since the diameter of the second pores 26 of the nanoporous membrane 10 according to the disclosed embodiments can be adjusted to the range described above, materials having a several nanometer size, for example, materials having an average diameter of 10 nm or less can pass through the second separation layer 13 of the nanoporous membrane 10 according to a single-file diffusion. That is, materials having a several nanometer size can pass through the nanoporous membrane 10 at a constant speed regardless of the concentration before passing through the nanoporous membrane 10. Furthermore, since the second pores 26 of the nanoporous membrane 10 has a very low standard deviation, materials having a several nanometer size can pass through the second pores 26 with a high selectivity.

Meanwhile, the second separation layer 13 includes the second matrix 28. The second matrix 28 may prevent a fouling which occurs on the surface of the second separation layer 13 in contact with various organic materials, viruses, or the like.

The second matrix 28 may be formed of a metal, a metal oxide or a metal nitride. For example, the metal may be Au, Ag, Al, Ti, Cu, Cr, Pt, Ni, W, Si and Ta, but is not limited thereto. Meanwhile, the metal oxide may be an oxide of the metal described above, but is not limited thereto, and the metal nitride may be an nitride of the metal described above, but is not limited thereto.

A thickness of the second separation layer 13 may be in the range of 1 to 30 nm, and preferably 1 to 20 nm. When the thickness of the second separation layer 13 is greater than 1 nm, the diameter of the second pores 26 may be easily controlled. On the other hand, when the thickness of the second separation layer 13 is less than 20 nm, the material flow path of the second pores 26 of the nanoporous membrane 10 may be appropriate. The thickness of the second separation layer 13 may be controlled by regulating deposition methods and/or deposition speed and deposition time of the second separation layer 13.

As described above, since the first separation layer 11 and the second separation layer 13 of the nanoporous membrane 10 according to the disclosed embodiments have a high pore density and an ultra-small thickness, the nanoporous membrane 10 has a high flux. In addition, due to a uniform pore size of the first separation layer 11 and the second separation layer 13, the nanoporous membrane 11 has high selectivity. In addition, since the average diameter of the second pores of the second separation layer may have the scale of several nanometers without reduction in the pore density and increase in standard deviation of diameters of the second pores, materials having a several nanometer size can pass through the second separation layer according to a single-file diffusion.

The pore density, average pore diameter and standard deviation of pore diameters of the first separation layer 11 and/or the second separation layer 13 in the nanoporous membrane 10 according to the disclosed embodiments may be calculated by an analysis of photographs of the first separation layer 11 and/or the second separation layer 13 obtained using field emission-scanning electron microscopy (FE-SEM) and/or atomic force microscopy (AFM), etc. This calculation method is disclosed in, for example, Polymer Engineering II, p. 370-372, Heejungdang, Sung-chul Kim et al., the disclosure of which is incorporated herein in its entirety by reference.

A process of fabricating a nanoporous membrane having the above-described structure according to the disclosed embodiments includes: preparing a substrate; forming an etching layer on the substrate; coating a phase-separable copolymer-containing composition on the etching layer and thermally treating the same to form a phase-separated copolymer layer; dipping the substrate having the phase-separated copolymer layer in an etching solution containing a support to fix the phase-separated copolymer layer to the support; dipping the support having the phase-separated copolymer layer in an acid solution to form a plurality of first nano-sized pores in the phase-separated copolymer layer, thereby forming in a first separation layer including a plurality of first nano-sized pores and a first matrix on the support; and forming a second separation layer including a plurality of second pores respectively corresponding to the plurality of first pores and having a diameter less than that of the first pores and a second matrix on the first separation layer.

A process of fabricating a nanoporous membrane according to an embodiment will be described in detail with reference to FIGS. 3A through 3F.

Referring to FIG. 3A, a substrate 30 is prepared. The substrate 30 transfers a phase-separated copolymer layer 42 onto a support 60. The substrate 30 is formed of a material which does not chemically react with the phase-separated copolymer layer 42. For example, the substrate 30 may be a silicon substrate.

Next, referring to FIG. 3B, an etching layer 31 is formed on the substrate 30. The etching layer 31 allows the phase-separated copolymer layer 42 to be separated from the substrate 30 so that the phase-separated copolymer layer 42 can be transferred onto the support 60, as described below. The etching layer 31 is formed of a material which does not chemically react with the phase-separated copolymer layer 42 and which can be easily separated through a process. For example, the etching layer 31 can be formed of a metal oxide, for example, silicon oxide, which can be easily removed when contacting an acid solution. Meanwhile, the etching layer 31 may have a thickness of 50 nm or greater. When the thickness of the etching layer 31 is too small, the phase-separated copolymer layer 42 cannot be smoothly separated from the substrate 30.

The etching layer 31 may be formed as a separate layer on the substrate 30 using a common deposition or coating method. Alternatively, the etching layer 31 may be formed by treating the surface of the substrate 30 using a common surface treatment method. For example, the etching layer 31 can be formed using a chemical vapor deposition method.

Next, referring to FIG. 3C, a phase-separated copolymer layer 42 is formed on the etching layer 31.

Before the phase-separated copolymer layer 42 is formed, the surface of the etching layer 31 may be optionally neutralized, treated with an electric field, or subjected to solvent vaporization such that different phase regions of the phase-separated copolymer layer 42 can be easily aligned perpendicular to the etching layer 31. This process can be performed using various common methods. For example, the surface of the etching layer 31 can be neutralized using random copolymer brushes (Refer to "Controlling Polymer-Surface Interaction with Random Copolymer Brushes", P. Mansky et al., SCIENCE, Vol. 275, 7 Mar. 1997, pp. 1458-1460).

The phase-separated copolymer layer 42 can be formed by coating a phase-separable copolymer-containing composition on the etching layer 31, which may be optionally neutralized, treated with an electric field, or subjected to solvent vaporization, and thermally treating the coated composition.

The phase-separable copolymer-containing composition contains a phase-separable copolymer and a solvent. The phase-separable copolymer is a copolymer that can form block phases by being self-assembled after being coated on the etching layer 31. Examples of the phase-separable copolymer include a copolymer including blocks consisting of different repeating units, such as a polystyrene-block-polyacryl copolymer, a polystyrene-block-polyisoprene copolymer, a polystyrene-block-polybutadiene copolymer, a derivative thereof, etc., but are not limited thereto.

The solvent in the phase-separable copolymer-containing composition can be any solvent that can dissolve or disperse the phase-separable copolymer. For example, the solvent can be toluene, THF, or benzene, but is not limited thereto.

In addition to the phase-separable copolymer and the solvent, the phase-separable copolymer-containing composition may further contain a homopolymer consisting of repeating units which are miscible with one of the blocks consisting the phase-separable copolymer. The homopolymer can control the pore diameter of the first separation layer.

The phase-separated copolymer layer 42 in FIG. 3C is obtained by coating the phase phase-separable copolymer-containing composition containing a phase-separable copolymer, a solvent, and a homopolymer and thermally treating the same. In the phase-separated copolymer layer 42, a first block region **42*a* and a second block region 42*b* are in different phases, and a homopolymer region 42*c* is surrounded by the second block region 42*b*. The homopolymer region 42*c* is formed from the homopolymer miscible with the second block region 42*b*** in the phase-separable copolymer.

For example, when polystyrene-block-polymethylmethacrylate (PS-b-PMMA) copolymer is used as a phase-separable copolymer and a polymethylmethacrylate homopolymer is used as the homopolymer, the first block region **42*a* is composed of polystyrene derived from the PS-b-PMMA copolymer, the second block region 42*b* is composed of the PMMA derived from the PS-b-PMMA copolymer, and the homopolymer region 42*c* is composed of the PMMA derived from a PMMA homopolymer as shown in FIG. 3**C.

A suitable homopolymer can be used according to the selected phase-separable copolymer. Examples of the homopolymer that can be used in the present invention are a polyacryl homopolymer, a polyisoprene homopolymer, a polybutadiene homopolymer, derivatives thereof, etc., but are not limited thereto.

Figure 3D:
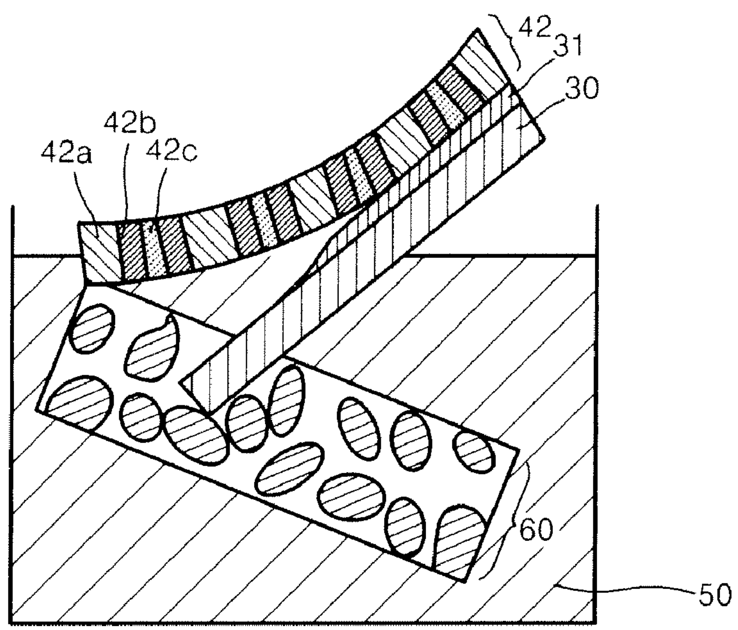

Next, referring to FIG. 3D, the substrate 30 with the phase-separated copolymer layer 42 is dipped in an etching solution 50 in which the support 60 is immersed to fix the phase-separated copolymer layer 42 to the support 60. In particular, as the etching layer 31 between the phase-separated copolymer layer 42 and the substrate 30 is dissolved in the etching solution 50, the phase-separated copolymer layer 42 is separated from the substrate 30 and fixed to the support 60.

The etching solution 50 may have a composition that can dissolve the etching layer 31 but does not chemically react with the phase-separated copolymer layer 42. Examples of the etching solution 50 that can be used in the disclosed embodiments are an aqueous hydrofluoric acid solution, an aqueous phosphoric acid solution, an aqueous hydroxide solution, etc., but are not limited thereof. The concentration of the etching solution 50 may be in a range of 5-30 wt %. When the concentration of the etching solution 50 is less than 5 wt %, the etching layer 31 cannot be effectively removed. When the concentration of the etching solution 50 exceeds 30 wt %, the phase-separated copolymer layer 42 may be damaged in addition to the etching layer 50.

Meanwhile, the support 60 immersed in the etching solution 50 is the same as described above.

Figure 3E:
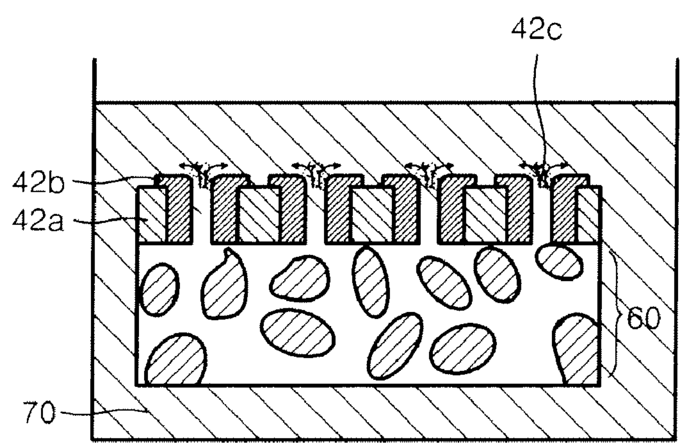

Next, the support 60 to which the phase-separated copolymer layer 42 is fixed is immersed in an acid solution, as illustrated in FIG. 3E, to form first nano-sized pores in the phase-separated copolymer layer 42, thereby resulting in a first separation layer including a plurality of first nano-sized pores and a second matrix on the support 60.

Figure 3F:
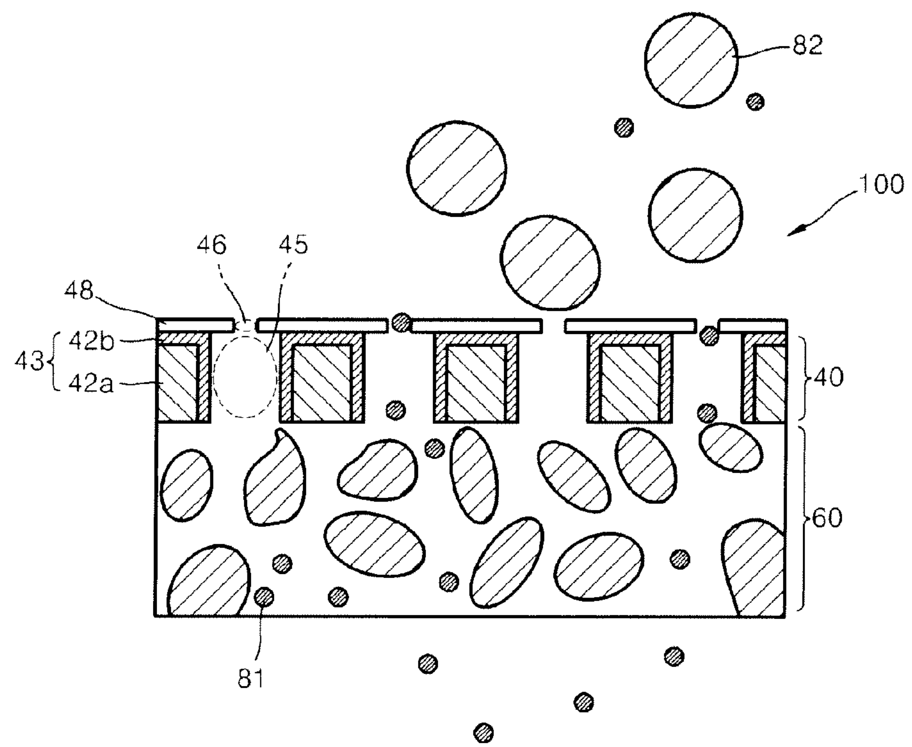

Here, referring to FIG. 3E, the homopolymer region 42*c* (FIG. 3D) of the phase-separated copolymer layer 42 is dissolved in the acid solution and forms first pores 45 in the first separation layer 40 of the nanoporous membrane 100 as shown in FIG. 3F. In addition, the second block region 42*b* of the phase-separable copolymer in the phase-separated copolymer layer 42 swells in directions indicated by the arrows in FIG. 3E and covers the first block region 42*a*. As a result, an inner portion 42*a* and a surface portion 42*b* of the matrix 43 in the first separation layer 40 of the nanoporous membrane 100 are completed.

The acid solution 70 can be any acid solution that can swell one of the blocks of the selected phase-separable copolymer. When a homopolymer is additionally used, an acid solution that can also dissolve the homopolymer should be used. Examples of the acid solution 70 are acetic acid, isopropyl alcohol, etc., but are not limited thereto. The concentration of the acid solution may be in a range of 10-50 wt %. When the concentration of the acid solution is less than 10 wt %, one of the blocks of the phase-separable copolymer cannot effectively swell, and thus the first pores 45 cannot be smoothly formed. When the concentration of the acid solution exceeds 50 wt %, the manufacturing costs are high.

Then, a second separation layer 49 is formed on the first separation layer 40 to fabricate a nanoporous membrane 100 of FIG. 3F. Here, a material that is used to form a second matrix 48 of the second separation layer 49 may be applied to the first separation layer using a known sputtering or deposition, for example thermal deposition or e-beam deposition. Since an average diameter of the first pores 45 in the first separation layer 40 has the scale of several or several tens nanometers, a material that is used to form the second matrix 48 of the second separation layer 49 is substantially formed on the first matrix 43 of the first separation layer 40. Meanwhile, if the material used to form the second matrix 48 is provided for a certain period of time, the second matrix 48 is formed on the first matrix 43 extending to the first pores 45. Thus, a second pores 46 having a diameter smaller than that of the first pores 45 may be formed on each of the corresponding first pores 45 as shown in FIG. 3F. Therefore, the thickness of the second separation layer 49 and the diameter of the second pores 46 may be controlled by regulating deposition method or deposition speed and deposition time of the material that is used to form the second matrix 48.

Referring to FIGS. 3C to 3F, the diameter of the first pores 45 in the first separation layer 40 may decrease as the amount of the homopolymer among the composition for phase-separable copolymer layer decreases since the size of a region 42*c* formed of the homopolymer in the phase-separable copolymer layer 42 decreases as shown in FIG. 3C.

However, the homopolymer region 42*c* having a several nanometer size may not be uniformly dissolved in an acid solution 70. Furthermore, pores, i.e., first pores 45, substantially larger than a size of the initial homopolymer region 42*c* are formed since a second block 42*b* of the phase-separable copolymer swells in directions indicated in FIG. 3E. As a result, it is substantially difficult to form the first pores 45 having a several nanometer size. In addition, although the first pores 45 having a several nanometer size are formed, it is difficult to control the standard deviation and density of the first pores 45.

Thus, the first pores having a several tens nanometer size are formed in order to control the standard deviation of the diameter and the density, and then the second separation layer 49 is formed thereon according to the process described above. Accordingly, the nanoporous membrane 100 may have the second pores 46 having a several nanometer size (including 10 nm). The second pores 45 of the second separation layer 49 may have a several nanometer size, a low standard deviation of the diameters and a high density.

As shown in FIG. 3F, a material having a several nanometer size 81 may pass through the nanoporous membrane according to a single-file diffusion regardless of the concentration of the material 81.

The pore density, average pore diameter and standard deviation of pore diameters, the thickness of the support and the thickness of the first separation layer are described above.

As described above, materials having a several nanometer size (including 10 nm) may pass through the nanoporous membrane according to the disclosed embodiments according to a single-file diffusion. The nanoporous membrane can be applied to a device for a controlled release of biopharmaceuticals.

Biopharmaceuticals can be transferred using various devices. The nanoporous membrane according to the disclosed embodiments can be applied to a patch type device for a release of biopharmaceuticals in which the biopharmaceuticals are transferred through the skin and an implant type device for device for a release of biopharmaceuticals which can be implanted in blood vessels, or the like. Commonly used biopharmaceuticals have a several nanometer size. Since the nanoporous membrane according to the disclosed embodiments may pass biopharmaceuticals having a several nanometer size according to a single-file diffusion, a device for a release of biopharmaceuticals including the nanoporous membrane may release at a constant rate regardless of the concentration of the residual biopharmaceuticals. Thus, the device for a release of biopharmaceuticals can release the biopharmaceuticals for a long period of time at a constant rate without side effects that the amount of the released biopharmaceuticals decreases with time.

Figure 4:
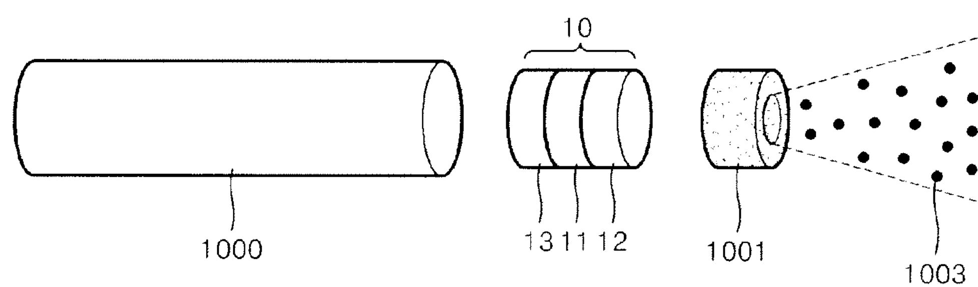
FIG. 4 schematically shows a device for a controlled release of biopharmaceuticals according to an embodiment.

FIG. 4 schematically shows an implant type device for a controlled release of biopharmaceuticals according to an embodiment.

The implant type device for a controlled release of biopharmaceuticals according to the present invention includes: a container for biopharmaceuticals 1000; a nanoporous membrane 10 including a second separation layer 13, a first separation layer 11 and a support 12; and an outlet 1001 releasing the biopharmaceuticals that have passed through the nanoporous membrane 10.

Elements connecting the container 1000, the nanoporous membrane 10 and the outlet 1001 are not described for the descriptive convenience. Since the second separation layer 13 of the nanoporous membrane 10 includes second pores 26 having a several nanometer size, the biopharmaceuticals (generally having a several nanometer size) in the container 1000 pass through the nanoporous membrane 10 according to a single-file diffusion. Thus, the release speed of the biopharmaceuticals 1003 passing through the nanoporous membrane 10 and released from the outlet 1001 is constantly controlled regardless of the concentration of the biopharmaceuticals in the biopharmaceuticals storage container 1000

Hereinafter, the disclosed embodiments will be described in greater detail with reference to the following examples. The following examples are only for illustrative purposes and are not intended to limit the scope of the invention.

EXAMPLES

Comparative Example A

A polysulfone membrane (HT-Tuffryn, available from Pall Co.), which is a disc type membrane having a diameter of 2.5 cm, a pore size of 0.2 μm, and a thickness of 150 μm, was prepared. The membrane was referred to as "Membrane A".

Comparative Example B

A silicon substrate having a size of 3 $cm^2$×3 $cm^2$ was prepared, and a silicon oxide layer having a thickness of 100 nm was formed as an etching layer on the silicon substrate through thermal chemical vapor deposition (CVD) at 1000□ in an oxygen atmosphere.

Then, a solution of 1 wt % of a polystyrene-random-polymethylmethacrylate (PS-random-PMMA) copolymer (synthesized through atomic transfer radical polymerization (ATRP) and having a 58:42 volume ratio of polystyrene to polymethylmethacrylate) in toluene was spin-coated on the silicon oxide layer at 1000 rpm for 60 seconds and thermally treated in a vacuum oven at 170□ for 48 hours to form a PS-random-PMMA copolymer layer having a thickness of 100 nm to neutralize the silicon oxide layer. Then, the substrate was washed with toluene.

0.0194 g of a polystyrene-block-polymethylmethacrylate (PS-b-PMMA) copolymer (synthesized through anionic polymerization and having a 75:25 volume ratio of polystyrene to polymethylmethacrylate, a weight average molecular weight (Mw) of 77,000, and a polydispersity index (PDI) of 1.06) as a phase-separable copolymer was added into 0.0583 g of a solution of 1 wt % of a PMMA homopolymer (available from Polymer Source Co., Mw=29,800, and PDI=1.08) in toluene, and toluene was further added into the mixture to obtain 1 g of a phase-separable copolymer-containing composition. The weight of the PMMA homopolymer in the phase-separable copolymer-containing composition was 10% of the weight of the PMMA block of the PS-b-PMMA copolymer.

The phase-separable copolymer-containing composition was spin-coated on the neutralized silicon oxide layer at 2500 rpm for 60 seconds and thermally treated in a vacuum oven at 170□ for 24 hours to form a 80-nm-thick phase-separated copolymer layer composed of the PS-b-PMMA copolymer and the PMMA homopolymer.

Next, a polysulfone membrane (HT-Tuffryn, available from Pall Co.), which is a disc type membrane having a diameter of 2.5 cm, a pore size of 0.2 μm, and a thickness of 150 m, was prepared as a support. The support was immersed in a 10 wt % hydrofluoric acid solution. Next, the substrate with the phase-separated copolymer layer was dipped in the hydrofluoric acid solution. As the silicon oxide layer dissolved in the hydrofluoric acid solution, the phase-separated copolymer layer on the silicon oxide layer was fixed on the support.

The support to which the phase-separated copolymer layer was fixed was dipped in a 30 wt % acetic acid solution to dissolve the PMMA homopolymer in the phase-separated copolymer layer and allow PMMA of the PS-b-PMMA copolymer to swell, thereby resulting in pores in the phase-separated copolymer layer. As a result, a membrane including a first separation layer having first nano-sized pores and a first matrix, and a support was completed. The membrane was referred to as "Membrane B".

Example 1

Au was thermally deposited on the first separation layer of Membrane B prepared according to Comparative Example B at 0.02 nm/s for 550 seconds to form a Au second separation layer having a thickness of 11 nm. This is referred to as "Membrane 1".

Example 2

Au was thermally deposited on the first separation layer of Membrane B prepared according to Comparative Example B at 0.02 nm/s for 350 seconds to form a Au second separation layer having a thickness of 7 nm. This is referred to as "Membrane 2".

Example 3

Ti was thermally deposited on the first separation layer of Membrane B prepared according to Comparative Example B at 0.02 nm/s for 350 seconds to form a Ti second separation layer having a thickness of 7 nm. This is referred to as "Membrane 3".

Example 4

Al was thermally deposited on the first separation layer of Membrane B prepared according to Comparative Example B at 0.02 nm/s for 350 seconds to form a Al second separation layer having a thickness of 7 nm. This is referred to as "Membrane 4".

Evaluation Example 1

Observation of Membranes A, B, 1, 2, 3 and 4

Figure 5A:
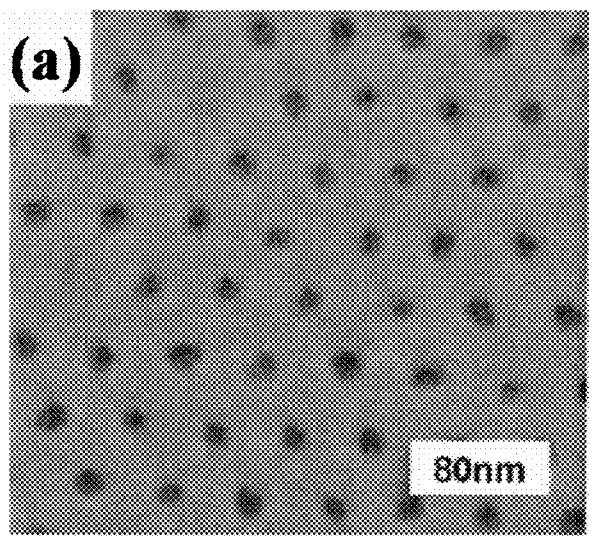
FIGS. 5A to 5B are photographs of the surface and cross-section of Membrane B.
Figure 5B:
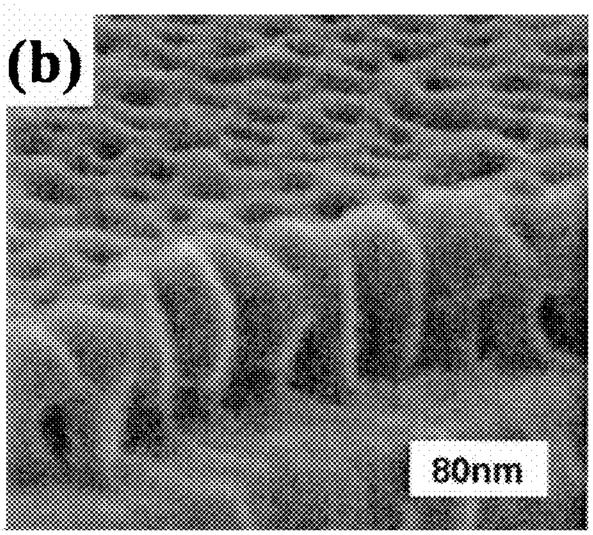
Figure 5C:
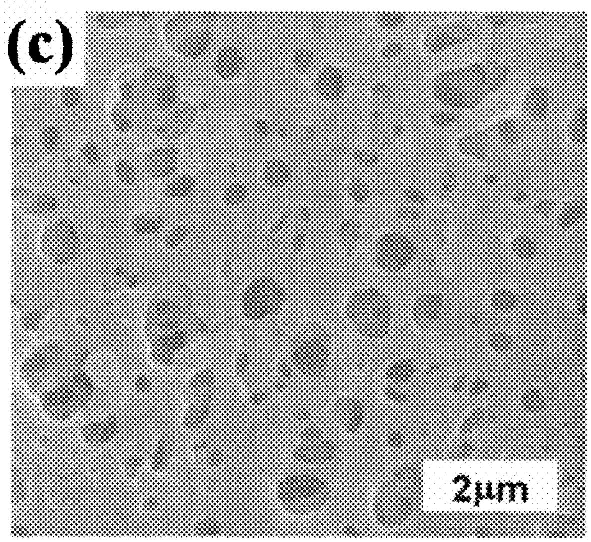
FIGS. 5C to 5D are photographs of the surface and cross-section of Membrane A.
Figure 5D:
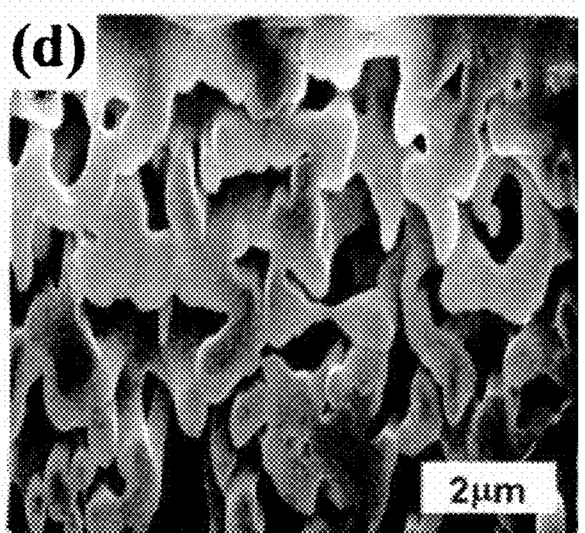
Figure 6A:
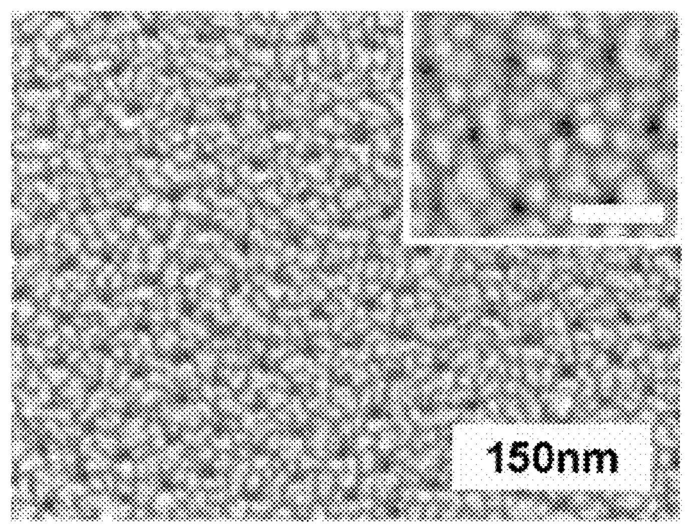
FIG. 6A is a photograph of the surface of Membrane 1.
Figure 6B:
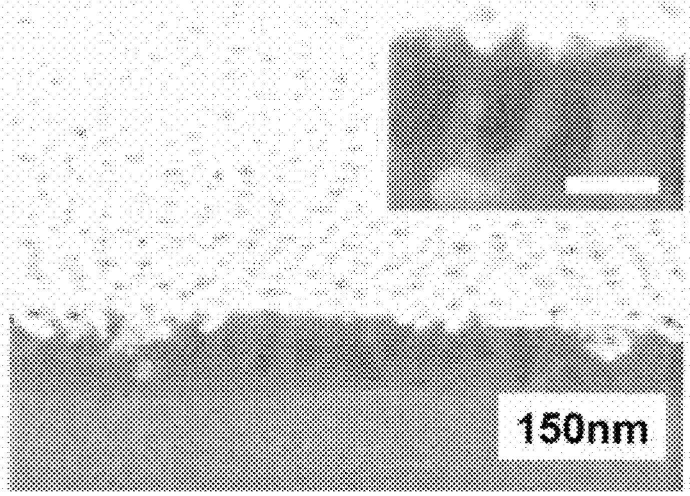
FIG. 6B is a photograph of the cross-section of Membrane 1.
Figure 6C:
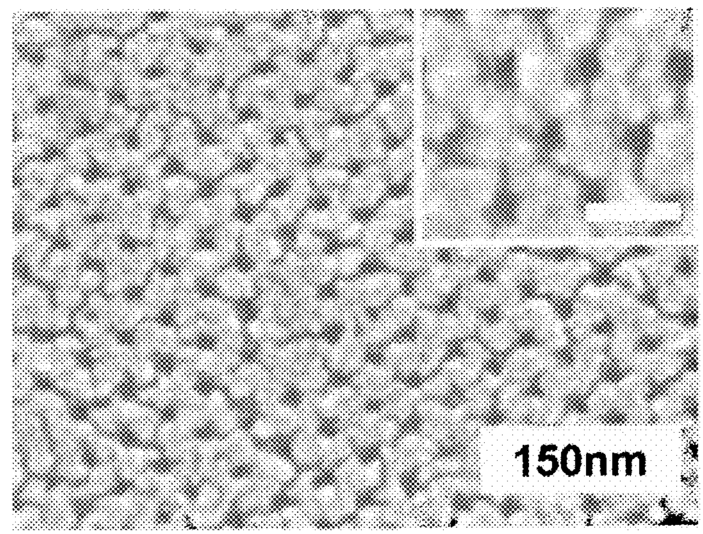
FIG. 6C is a photograph of the surface of Membrane 2.
Figure 6D:
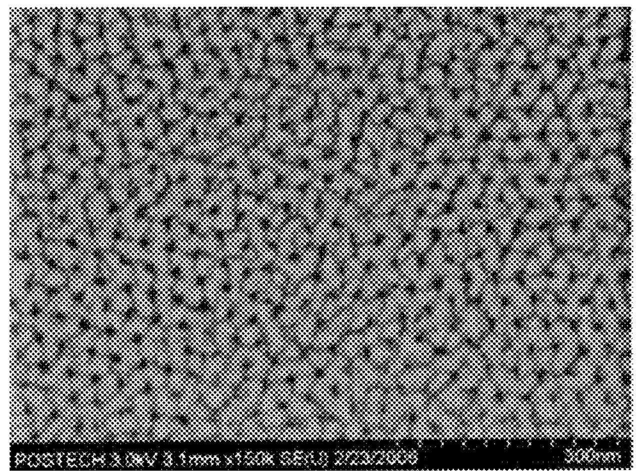
FIG. 6D is a photograph of the surface of Membrane 3.
Figure 6E:
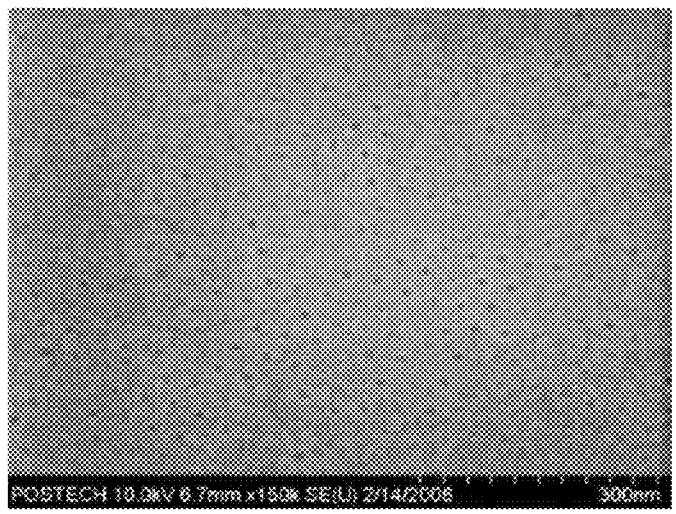
FIG. 6E is a photograph of the surface of Membrane 4.

The surfaces and/or cross-sections of Membranes A, B, 1, 2, 3 and 4 were observed using field emission-scanning electron microscopy (FE-SEM, Hitachi S-4200) and atomic force microscopy (AFM, Digital Instrument Co.). FIGS. 5A and 5B are photographs of the surface and cross-section of Membrane B, i.e., the first separation layer, and FIGS. 5C and 5D are photographs of the surface and cross-section of Membrane A, i.e., the support. FIG. 6A is a photograph of the surface of the Au second separation layer of Membrane 1, FIG. 6B is a photograph of the cross-section of Membrane 1, FIG. 6C is a photograph of the surface of the Au second separation layer of Membrane 2, FIG. 6D is a photograph of the surface of the Ti second separation layer of Membrane 3, and FIG. 6E is a photograph of the surface of the Al second separation layer of Membrane 4.

Evaluation Example 2

Analysis of Pore Density, Average Pore Diameter and Standard Deviation of Pore Diameters of First Separation Layer and/or Second Separation Layer of Membranes B and 1 to 4

The pore density, average pore diameter, and standard deviation of pore diameters of the first separation layers of Membrane B were calculated through an analysis on the AFM photograph of FIG. 5A.

Figure 7:
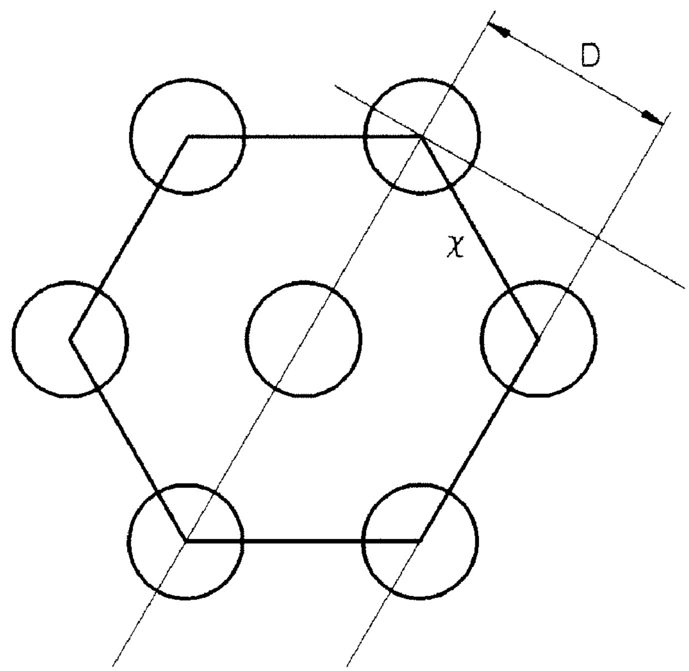
FIG. 7 schematically illustrates a first separation layer in order to calculate a pore density of first pores of Membrane B.

The pore density was calculated according to Equations 1 and 2 below with the assumption that first pores (circular portions in FIG. 7) of Membrane B are hexagonally packed in a matrix (a portion around the pores) of the first separation layer as illustrated in FIG. 7. In Equation (1), 3 was substituted for N under the assumption of the hexagonal packing of pores. In Equation (2), D, which indicates a domain spacing of the phase-separated copolymer layer as illustrated in FIG.

7, was 34.4 nm, which was measured using small-angle X-ray scattering (SAXS, 4C1 beamline of the Pohang Accelerator Laboratory (PAL)). The pore density of the first separation layer of Membrane B was as high as $9.8\times10^{10}/cm^2$.

$$\text{Pore density (number/cm}^2\text{)}=N/A(\text{nm}^2)\times10^{14}(\text{nm}^2/\text{cm}^2) \qquad \text{Equation 1}$$

Here, N indicates the number of pores in a single regular hexagonal unit, and A is the area of the regular hexagonal unit.

$$A(\text{nm}^2)=3^{2/1}/4\times(D/\cos 30°)^2\times6(\text{nm}^2) \qquad \text{Equation 2}$$

Here, D indicates a domain spacing in the phase-separated polymer layer.

In Equation (2), D/cos 30° corresponds to the distance between pores indicated by x in FIG. 7.

Figure 8:
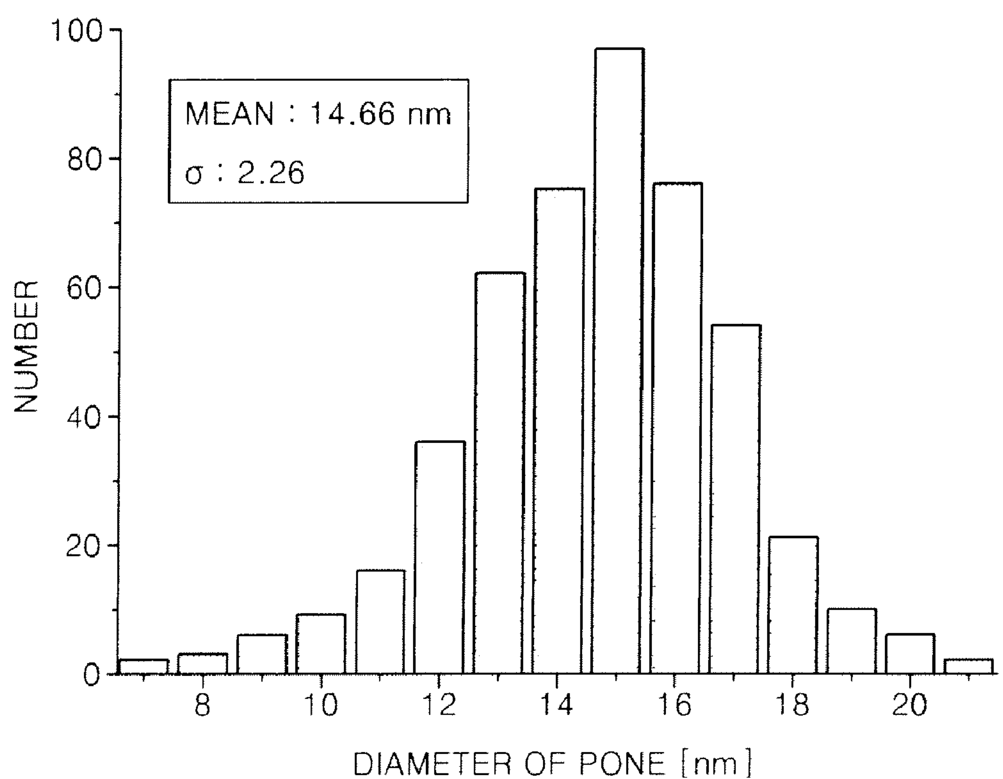
FIG. 8 is a graph of pore diameter distribution of the first pores of Membrane B.

FIG. 8 is a graph of pore diameter distribution in the first separation layer of Membrane B obtained through an analysis of the AFM photograph of FIG. 5A. The average pore diameter and the standard deviation of pore diameters of the first pores in the first separation layer of Membrane B were calculated using the results in FIG. 8. The average pore diameter and the standard deviation of pore diameters of the first pores in the first separation layer were 14.66 nm and 2.26, respectively. In the same manner, the pore density, average pore diameter, and standard deviation of pore diameters of Membranes 1 to 4 were obtained as follows.

TABLE 1

| | First pores in first separation layer | | | Second pores in second separation layer | | |
|---|---|---|---|---|---|---|
| Membrane No. | Pore density (number/cm²) | Average pore diameter (nm) | standard deviation of pore diameters | Pore density (number/cm²) | Average pore diameter (nm) | standard deviation of pore diameters |
| Membrane B | $9.8\times10^{10}$ | 14.66 | 2.26 | — | — | — |
| Membrane 1 | $9.8\times10^{10}$ | 14.66 | 2.26 | $9.8\times10^{10}$ | 6 | 3.1 |
| Membrane 2 | $9.8\times10^{10}$ | 14.66 | 2.26 | $9.8\times10^{10}$ | 10 | 2.6 |
| Membrane 3 | $9.8\times10^{10}$ | 14.66 | 2.26 | $9.8\times10^{10}$ | 10 | 2.5 |
| Membrane 4 | $9.8\times10^{10}$ | 14.66 | 2.26 | $5\times10^{10}$ | 11 | 3.5 |

According to the results, the second pores in the second separation layer of Membranes 1 to 4 according to the disclosed embodiments have a several nanometer size. Furthermore, since the second pores have a very low standard deviation, it can be identified that pores having a uniform size are formed.

Evaluation Example 3

Figure 9A:
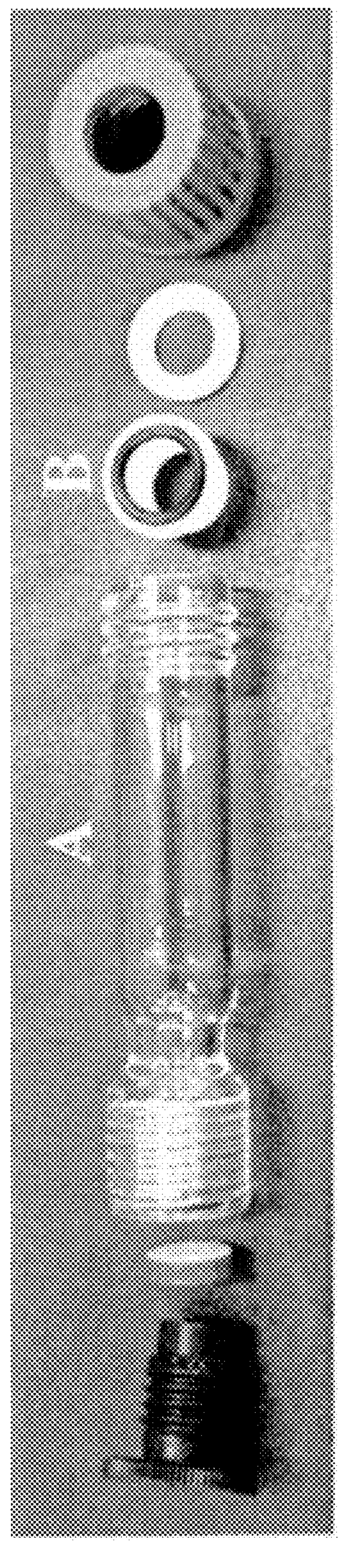
FIG. 9A is a photograph of an exploded device for a release of biopharmaceuticals.
Figure 9B:
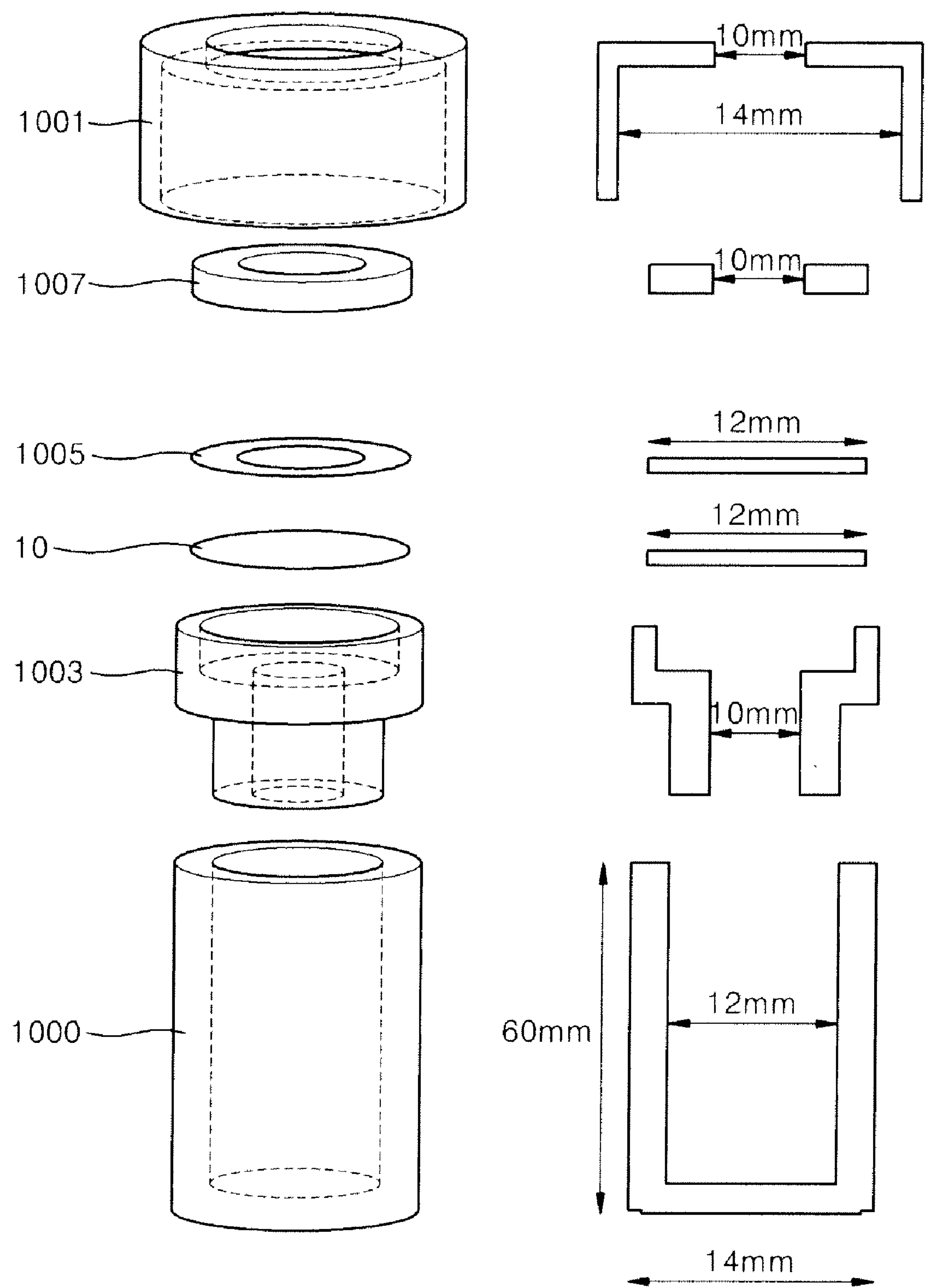
FIG. 9B is a schematic diagram illustrating elements and the size of the elements of the device for a release of biopharmaceuticals of FIG. 9A.

Evaluation of Release of Biopharmaceuticals 4 devices for a release of biopharmaceuticals having the size and shape illustrated in FIG. 9A which is a photograph of an exploded device for a release of biopharmaceuticals and FIG. 9B which is a schematic diagram illustrating elements and the size of the elements of the device for a release of biopharmaceuticals of FIG. 9A were prepared. According to FIG. 9B, the device for a release of biopharmaceuticals includes a glass container for biopharmaceuticals 1000, a Teflon support to which the container for biopharmaceuticals 1000 is connected and on which Membrane 10 is disposed, Membrane 10, O-ring 1005, a pressing element formed of Teflon 1007, and an outlet for releasing biopharmaceuticals 1001.

The 4 devices for a release of biopharmaceuticals were numbered from 1 to 4, and devices for a release of biopharmaceuticals having configurations as follows were prepared.

TABLE 2

| Device No. | Membrane No. (Reference Numeral 10 in FIG. 9B) | Biopharmaceuticals in the container 1000 |
|---|---|---|
| 1 | Membrane A | 6 ml of bovine serum albumin (BSA) in PBS (molecular weight: 67 k Dalton, ~8 nm, concentration: 5 mg/ml) |
| 2 | Membrane B | 6 ml of bovine serum albumin (BSA) in PBS (molecular weight: 67 k Dalton, ~8 nm, concentration: 5 mg/ml) |
| 3 | Membrane B | 6 ml of human growth hormone (hGH) in PBS (molecular weight: 22 k Dalton, ~3 nm, concentration: 5 mg/ml) |
| 4 | Membrane 1 | 6 ml of human growth hormone (hGH) in PBS (molecular weight: 22 k Dalton, ~3 nm, concentration: 5 mg/ml) |

In the preparation of Devices for a release of biopharmaceuticals 1 to 4, Membranes were cut into a size of 12 mm, and the first separation layer and/or the second separation layer of each of the membranes were in contact with the container of biopharmaceuticals. Then, each of Devices for a release of biopharmaceuticals 1 to 4 were immersed in a sink having 60 ml of pure PBS solution, and the amount of released BSA or hGH was measured. While the temperature was maintained at 37° C. and the sink was stirred at 200 rpm, 1 ml of the solution of the sink was sampled once in every 24-72 hours, and 1 ml of pure PBS solution was added to the sink to preserve the amount of the solution. The solution was periodically replaced with pure PBS solution, for example, once in every 1-2 weeks. The amount of the released BSA was calculated through Bradford assay by measuring absorbance at 595 nm using UV spectrophotometer, and the amount of the released hGH was calculated through lowry assay by measuring absorbance at 750 nm.

Figure 10A:
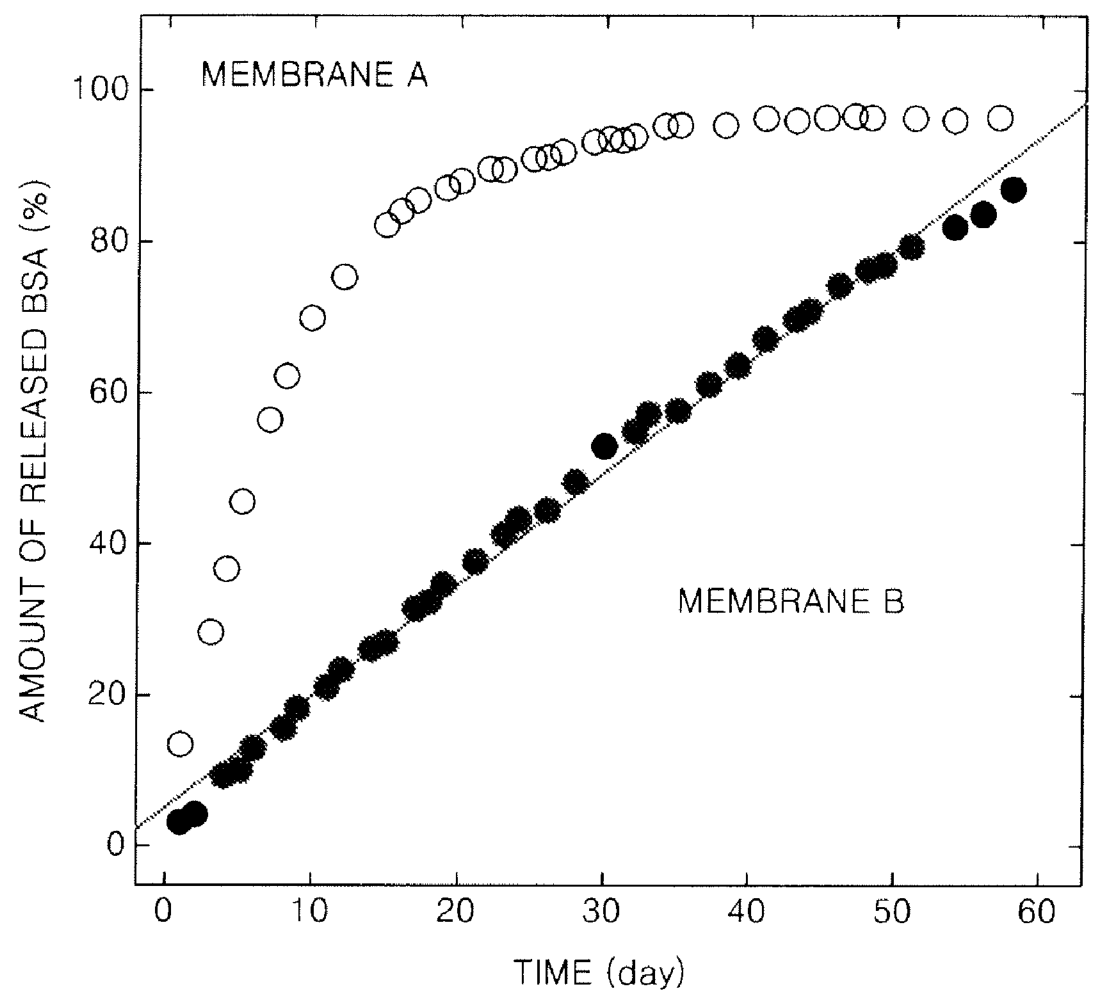
FIG. 10A is a graph illustrating the relationship between time and the amount of released BSA in Membrane A and Membrane B.

FIG. 10A is a graph illustrating the relationship between time and the amount of released BSA in Membrane A and Membrane B. According to FIG. 10A, the graph of BSA illustrates a Fickian diffusion in Membrane A, and illustrates a single-file diffusion in Membrane B.

Figure 10B:
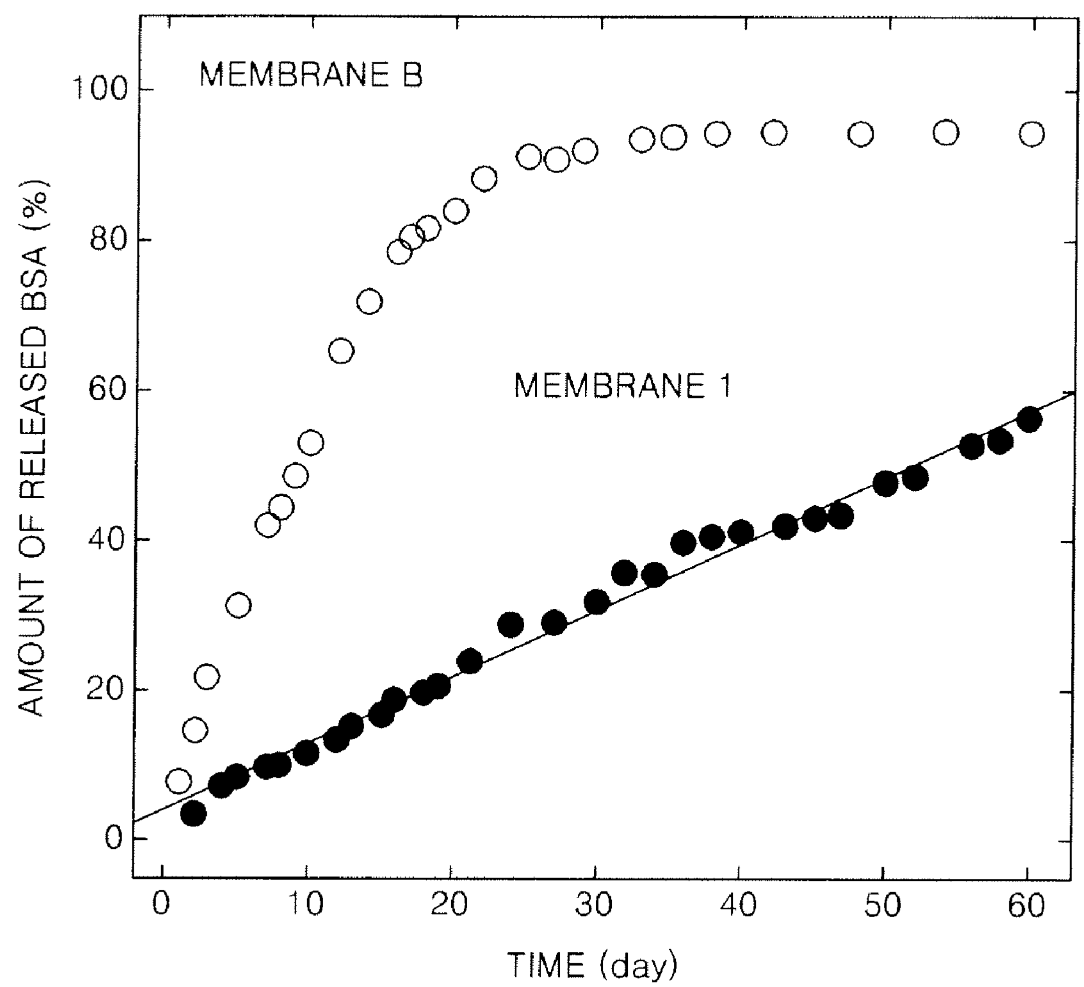
FIG. 10B is a graph illustrating the relationship between time and the amount of released hGH in Membrane B and Membrane 1.

FIG. 10B is a graph illustrating the relationship between time and the amount of released hGH in Membrane B and Membrane 1. According to FIG. 10B, the graph of hGH illustrates a Fickian diffusion in Membrane B, and illustrates a single-file diffusion in Membrane 1.

Although the experiments releasing the biopharmaceuticals were performed for 60 days in this Evaluation Example, the conditions for the experiments can be controlled according to the diameter of the second pores of the second separation layer of the membranes, the initial concentration of the biopharmaceuticals, the size of the biopharmaceuticals, etc.

Evaluation Example 4

Evaluation of Denaturation of Biopharmaceuticals for a Long-Term Release

Figure 11:
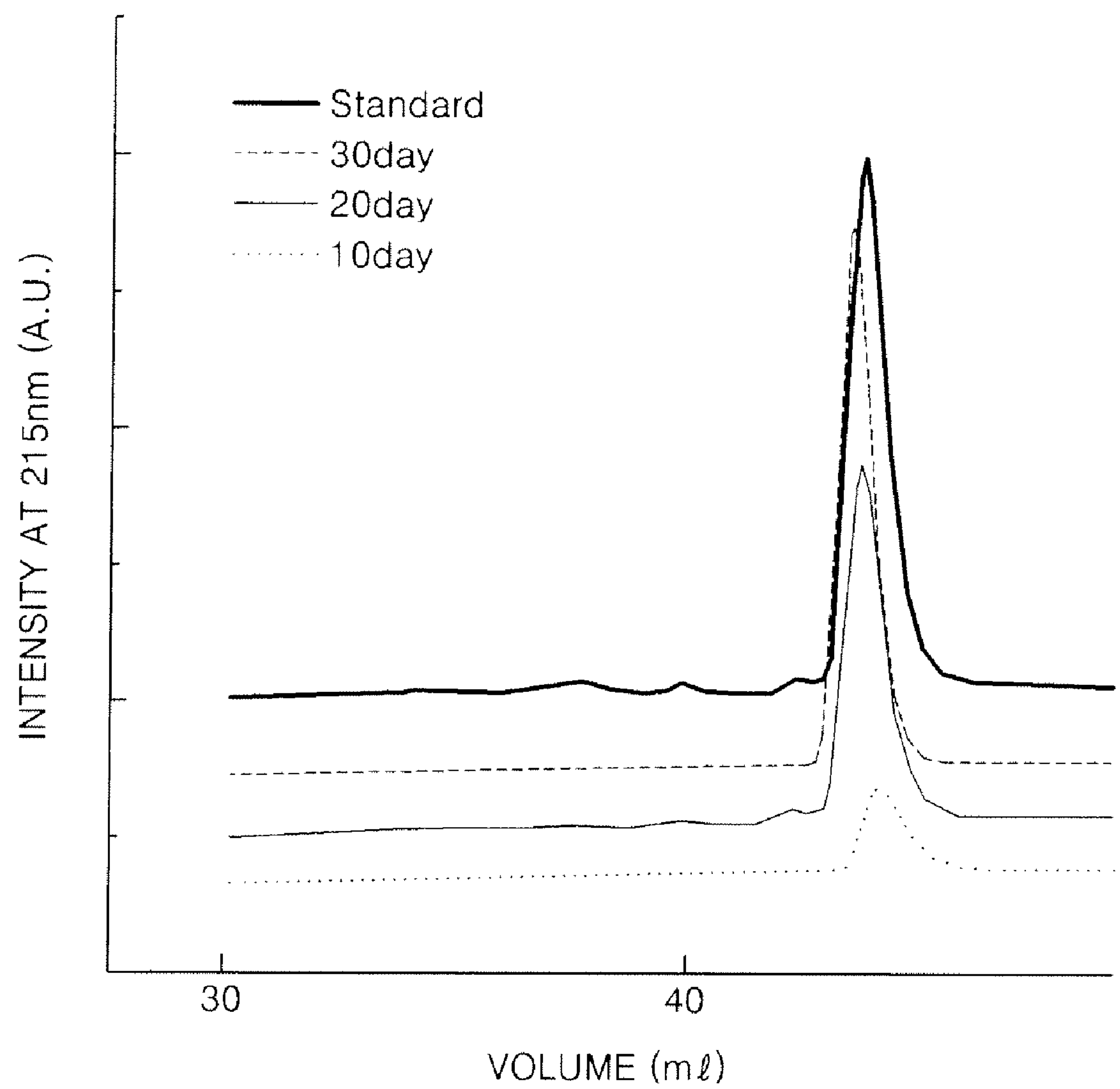
FIG. 11 is a graph illustrating results of reverse phase high performance liquid chromatography (RP-HPLC) of released hGH passing through Membrane 1.

In order to identify denaturation of hGH in a long-term release (60 days) through Membrane 1, hGH that has passed through Membrane 1 was analyzed using a reverse phase high performance liquid chromatography (HPLC), and the results are shown in FIG. 11. The experiments was performed a HPLC device of Amersham Pharmacia using Vydac C18 (size: 4.6×250 mm, capacity: 5 um) as a column. Buffer A (0.1% Trifluoroacetic acid (TFA) in Deionized water) and Buffer B (0.1% TFA in acetonitrile (ACN)) were used as mobile phases. The flow rate was adjusted to 0.3 ml/min and the gradient was controlled as follows:

TABLE 3

| Gradient | Buffer B |
|---|---|
| 0~7 min | 0% |
| ~11 min | 40% |
| ~30 min | 100% |

According to FIG. 11, superior stability of the device for a release of biopharmaceuticals including Membrane 1 was identified since hGH was not substantially denaturized after passing through Membrane 1.

The nanoporous membrane according to the disclosed embodiments has a high pore density and uniform pore size, thereby having a high flux and high selectivity, and through which materials having a several nanometer size pass according to a single-file diffusion. Thus, using the nanoporous membrane according to the disclosed embodiments, the flow rate and separation of materials having a several nanometer size, for example various biopharmaceuticals can be controlled, and the release rate of the biopharmaceuticals can be constantly controlled. Thus, the device for a release of biopharmaceuticals including the nanoporous membrane can be widely used in controlled releasing treatments.

While the disclosed embodiments have been particularly shown and described with reference to exemplary embodiments thereof, it will be understood by those of ordinary skill in the art that various changes in form and details may be made therein without departing from the spirit and scope of the embodiments as defined by the following claims.

What is claimed is:

1. A nanoporous membrane comprising a support;

a first separation layer comprising a plurality of first nano-sized pores and a first matrix; and a second separation layer comprising a plurality of second pores respectively corresponding to the plurality of first pores of the first separation layer and a second matrix, and formed on the first separation layer, wherein a density of the plurality of the first pores and the second pores is equal to or greater than $10^{10}/cm^2$, a diameter of each of the second pores is less than that of the corresponding first pore, and the second matrix is formed of a metal, a metal oxide or a metal nitride.

2. The nanoporous membrane of claim 1, wherein the second matrix is formed of one metal selected from the group consisting of Au, Ag, Al, Ti, Cu, Cr, Pt, Ni, W, Si and Ta.

3. The nanoporous membrane of claim 1, wherein the second matrix is formed of an oxide or a nitride of one metal selected from the group consisting of Al, Ti, Cu, Cr, Ni, W, Si and Ta.

4. The nanoporous membrane of claim 1, wherein a thickness of the second separation layer is in the range of 1 to 20 nm.

5. The nanoporous membrane of claim 1, wherein an average diameter of the first pores is in the range of 6 to 40 nm.

6. The nanoporous membrane of claim 1, wherein an average diameter of the second pores is in the range of 4 to 30 nm.

7. The nanoporous membrane of claim 1, wherein each of the standard deviations of diameters of the first pores and the second pores is 4 or less.

8. The nanoporous membrane of claim 1, wherein the first pores and the second pores penetrate through the first and second separation layers perpendicular to a surface of the support.

9. The nanoporous membrane of claim 1, wherein the first matrix of the first separation layer comprises an inner portion and a surface portion covering the inner portion.

10. The nanoporous membrane of claim 9, wherein the inner portion of the matrix is formed of polystyrene, and the surface portion of the matrix is formed of one of polyacryl, polyisoprene and polybutadiene.

11. The nanoporous membrane of claim 1, wherein a thickness of the first separation layer is in the range of 10 to 200 nm.

12. A process of fabricating a nanoporous membrane of claim 1, the method comprising:

preparing a substrate;

forming an etching layer on the substrate;

coating a phase-separable copolymer-containing composition on the etching layer and thermally treating the same to form a phase-separated copolymer layer;

dipping the substrate having the phase-separated copolymer layer in an etching solution containing a support to fix the phase-separated copolymer layer to the support;

dipping the support having the phase-separated copolymer layer in an acid solution to form a plurality of first nano-sized pores in the phase-separated copolymer layer, thereby forming in a first separation layer including a plurality of first nano-sized pores and a first matrix on the support; and forming a second separation layer comprising a plurality of second pores respectively corresponding to the plurality of first pores and having a diameter less than that of the first pores and a second matrix on the first separation layer.

13. The process of claim 12, wherein the forming the second separation layer is performed by sputtering or deposition.

14. A device for a controlled release of biopharmaceuticals comprising a nanoporous membrane according to claim 1.

15. The device of claim 14, being an implant type or a patch type.

16. The device of claim 14, further comprising a container for biopharmaceuticals and an outlet, wherein the biopharmaceuticals stored in the container pass through the nanoporous membrane and the outlet to be released.

17. A device for a controlled release of biopharmaceuticals comprising a nanoporous membrane being an implant type or a patch type comprising:

a support;

a first separation layer comprising a plurality of first nano-sized pores and a first matrix; and a second separation layer comprising a plurality of second pores respectively corresponding to the plurality of first pores of the first separation layer and a second matrix, and formed on the first separation layer, wherein a density of the plurality of the first pores and the second pores is equal to or greater than $10^{10}/cm^2$, and a diameter of each of the second pores is less than that of the corresponding first pore.

* * * * *